United States Patent
Cunningham et al.

(10) Patent No.: US 7,609,972 B2
(45) Date of Patent: Oct. 27, 2009

(54) ACQUISITION, POINTING, AND TRACKING ARCHITECTURE FOR LASER COMMUNICATION

(75) Inventors: James Cunningham, Dayton, OH (US); Dean Grinch, Dublin, OH (US); Donald Fisher, Spring Valley Township, OH (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 594 days.

(21) Appl. No.: 11/194,741

(22) Filed: Aug. 2, 2005

(65) Prior Publication Data

US 2007/0031151 A1 Feb. 8, 2007

(51) Int. Cl.
H04B 10/00 (2006.01)

(52) U.S. Cl. .............. 398/118; 398/119; 398/122; 398/123

(58) Field of Classification Search .......... 398/31, 398/118, 119, 122, 123, 129, 131, 115
See application file for complete search history.

(56) References Cited

U.S. PATENT DOCUMENTS

| | | | |
|---|---|---|---|
| 6,347,001 B1* | 2/2002 | Arnold et al. | 398/122 |
| 6,816,112 B1* | 11/2004 | Chethik | 342/357.14 |
| 7,110,678 B2* | 9/2006 | Willebrand et al. | 398/115 |
| 7,295,556 B2* | 11/2007 | Roese et al. | 370/395.3 |
| 7,424,225 B1* | 9/2008 | Elliott | 398/115 |
| 2002/0097468 A1* | 7/2002 | Mecherle et al. | 359/152 |
| 2002/0131121 A1* | 9/2002 | Jeganathan et al. | 359/152 |
| 2005/0069325 A1 | 3/2005 | Cicchiello et al. | |

FOREIGN PATENT DOCUMENTS

WO 02095989 A1 11/2002

OTHER PUBLICATIONS

PCT International Search Report and Written Opinion in counterpart International Application No. PCT/US2006/029915, dated Apr. 29, 2008.

* cited by examiner

*Primary Examiner*—Dalzid Singh
(74) *Attorney, Agent, or Firm*—Edell, Shapiro & Finnan, LLC

(57) ABSTRACT

A technique for acquiring and tracking terminals in a free-space laser communication system involves exchanging beacon laser beams between the terminals to acquire and then track the terminals such that data laser beams exchanged by the terminals for communication are steered based on feedback from detection of the beacon laser beams. The beacon laser beams used for acquisition have a greater beam divergence than those used for tracking. Gimbals provide coarse steering of the data laser beams, and steering mirrors provide fine steering. GPS position data exchanged via an RF link can be used for initial pointing of the beacon laser beams for acquisition. The beacon laser beams can be chopped such that all terminals can use the same beacon wavelength and are distinguished by using different chopping frequencies. By detecting a chopped signal, the position sensor detector can be AC coupled to reduce sensitivity to solar radiation and glint.

43 Claims, 4 Drawing Sheets

ACQUISITION, POINTING, AND TRACKING ARCHITECTURE FOR LASER COMMUNICATION

GOVERNMENT LICENSE RIGHTS

The U.S. Government may have a paid-up license in this invention and the right in limited circumstances to require the patent owner to license others on reasonable terms as provided for by the terms of contract No. F33615-01-D-1849.

BACKGROUND OF THE INVENTION

1. Field of the Invention

The present invention relates to an acquisition, pointing, and tracking scheme useful in a laser communication system.

2. Description of the Related Art

While free-space laser communication systems offer the potential to transmit data at very high data rates over long distances, developing practical systems that operate reliably in moving platform environments (e.g., airborne, space, and ground vehicles) presents unique challenges. Due to the changing positions of moving platforms, acquisition schemes and precise beam pointing and tracking capabilities are required to operate in these environments. Particularly with airborne platforms, where movement of aircraft can be rapid (compared to ground vehicles) and unpredictable (compared to satellites), it is critical that the pointing and tracking scheme provide accurate guidance for directing the data laser beams.

Consider a scenario in which two laser communication terminals whose relative positions may change are engaged in two-way communication (e.g., either one or both of the terminals are mobile). In each terminal, one option for determining the angular direction of the other terminal (i.e., the far-end terminal) is to split off a portion of the data laser beam received from the far-end terminal and determine the angle of arrival of the split-off data laser beam signal. This approach has a number of disadvantages. By using a portion of the received data laser beam for position detection, only the remaining portion of the received data laser beam is available for reception of the data, thereby reducing the signal power at the receiver and reducing the maximum operating range of the system. Moreover, it is desirable to minimize the beamwidth of the data laser beam in order to maximize signal strength and operating range. Given the limited angular extent of the data laser beam, initial acquisition of a remote terminal is difficult with the data laser beam. Likewise, once a communication link has been established between terminals, it may be difficult for the terminals to continuously track each other using narrow data laser beams, since either terminal can fairly quickly move out of the beam when the relative angular direction of the terminals is changing rapidly.

Further, current AC coupled position sensing detectors for determining the angle of arrival of laser beams have frequency bandwidths that extend up to only a few megahertz. In laser communications, data can be modulated onto the laser beam using modulation on the order of gigahertz up to hundreds of gigahertz. This modulation makes the data-carrying laser beams virtually invisible to AC coupled position sensing detectors, which currently don't have the bandwidth to sense the gigahertz modulation frequencies.

Additionally, laser tracking schemes can be susceptible to glint and solar radiation, and the track of a moving terminal may be lost if the terminal's line of sight approaches the line of sight of the sun or if persistent glint is present. Accordingly, there remains a need for improved schemes for acquisition, pointing, and tracking in laser communication systems, particularly in those involving moving platforms.

SUMMARY OF THE INVENTION

According to an exemplary embodiment of the present invention, a technique for acquiring and tracking laser communication terminals in a free-space laser communication system includes: acquiring the laser communication terminals by exchanging acquisition beacon laser beams between the laser communication terminals; and tracking the terminals by exchanging tracking beacon laser beams between the laser communication terminals, such that data laser beams exchanged by the terminals for communication are steered based on feedback from detection of the tracking beacon laser beams. The acquisition beacon laser beams have a greater beam divergence than the tracking beacon laser beams. The tracking beacon laser beams preferably have a greater beam divergence than the data laser beams used for communication. Further, the beacon laser beams are preferably transmitted at a different wavelength than the data laser beams. GPS position data exchanged between the laser communication terminals via an RF link can be used for initial pointing of the acquisition beacon laser beams.

Each free-space laser communication terminal includes a gimbal system on which is mounted: a beacon aperture assembly for transmitting the beacon laser beams; a data aperture such as a telescope for transmitting and receiving the data laser beams and for receiving the beacon laser beams; a steering mirror for controlling an angle at which laser beams are transmitted and received by the data aperture; and a position sensor detector for detecting a direction of beacon laser beams received by the data aperture. Based on feedback from the position sensor detector, a controller controls the positioning of the gimbal system to effect coarse steering of the beacon aperture assembly and the data aperture toward the far-end terminal and controls the positioning of the steering mirror to effect fine steering of the data aperture.

The beacon laser beams can be modulated on and off such that they are essentially "chopped" laser beams. In this manner, all of the laser communication terminals can transmit and receive beacon laser beams at the same wavelength, using different chopping frequencies to identify and distinguish the terminals. Using a chopped beacon laser signal has the added advantage that the position sensor detector, such as a quad cell detector, can be AC coupled, which reduces sensitivity to solar radiation and glint.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

Figure 1:
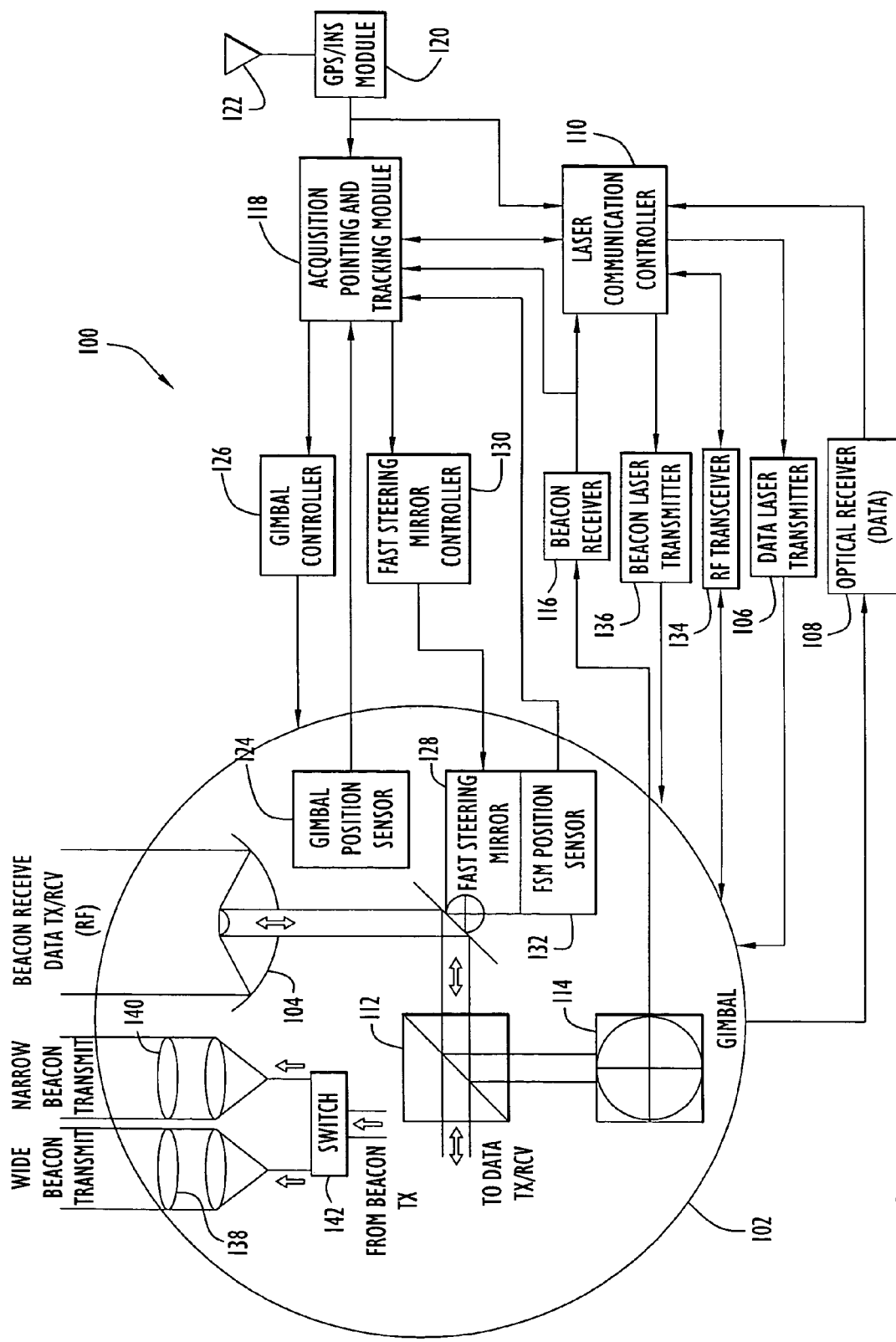
FIG. 1 is a block diagram illustrating the architecture of a laser communication terminal in accordance with an exemplary embodiment of the present invention.

The following detailed explanations of FIGS. 1-4 and of the preferred embodiments reveal the methods and apparatus of the present invention. FIG. 1 illustrates the system architecture for a laser communication terminal 100 employing an acquisition, pointing, and tracking scheme according to an exemplary embodiment of the present invention. The architecture depicted in FIG. 1 is a conceptual diagram illustrating major functional units, and does not necessarily illustrate physical relationships.

Laser communication terminal 100 is designed to operate in a laser communication system with moving platforms, where the relative positions of terminals change over time. The system can include, for example, terminals mounted on airborne platforms, satellites, ships, watercraft, or ground vehicles, as well as stationary terminals that communicate with terminals mounted on moving platforms (e.g., combinations of air-to-air and air-to-ground links). The system can include any number of terminals in communication with each other in a networked manner. Since the system communicates using directional laser beams, the optical components required to transmit and receive signals are mounted on a gimbal system 102 that permits rotation in azimuth and elevation so that beams can be pointed over a wide range of directions.

By way of a non-limiting example, in the case of an aircraft, any apertures, telescope, mirrors, antenna, etc., required for transmitting and receiving beams, along with supporting optical components, can be contained in a gimbal-driven turret having a dome-like enclosure that protrudes from an exterior surface of the aircraft, which can rotate through all or nearly all of 360° in azimuth and through 180° in elevation (e.g., a 20° azimuth blind area may be located toward the rear of the aircraft where substantial air turbulence degrades performance). As used herein and in the claims, the term aperture refers to any telescope, lens, mirror, antenna or other mechanism for transmitting beams into free space and/or receiving beams from free space.

Referring again to FIG. 1, a telescope 104 is mounted on gimbal 102 for transmitting data laser beams toward a far-end terminal and receiving data laser beams from the far-end terminal to effect two-way communication. By way of a non-limiting example, telescope 102 can be a compact 10x a focal telescope having a four inch aperture, with a coated aluminum surface, and 1 to 0.7 width to diameter to length aspect ratio. Preferably, data laser beams are transmitted at one wavelength and received at another wavelength such that telescope 104 can simultaneously transmit and receive data laser beams and operate in a full-duplex mode. Additionally, telescope 104 is responsible for receiving a beacon laser beam used to determine the angular direction (position) of the far-end transceiver, which can be used to control the pointing direction of the transmit and receive laser beams. The beacon laser beam is preferably transmitted from the far-end transceiver terminal via a separate beacon aperture with a wider beamwidth than the data laser beams and at a different wavelength than the data laser beams.

As shown in FIG. 1, data laser beams travel to and from telescope 104 along a common optical axis as free-space collimated beams. A data laser transmitter 106 generates transmit laser beams modulated with data to be conveyed to the far-end terminal and supplies the transmit laser beams to the common optical axis for transmission by telescope 104. Data laser beams received by telescope 104 are supplied to an optical receiver 108 that demodulates the receive laser beam and recovers the data therein. Data laser transmitter 106 and optical receiver 108 operate under the control of a laser communication controller 110, which coordinates the overall communication operation. For simplicity, the couplings between the transmit and receive data laser beam paths and the common optical axis are omitted in FIG. 1.

The beacon laser beam received by telescope 104 also travels along the common optical axis. A beamsplitter 112 directs the beacon laser beam from the common optical axis to a position detector sensor 114, which can be a quad cell detector. The output signals from the position detector sensor are supplied to a beacon receiver 116, which determines the angle of arrival of the beacon signal, indicating the angular direction of the far-end terminal. This position information is supplied to the laser communication controller 110 and an acquisition, pointing, and tracking module 118 responsible for controlling the process of initially acquiring remote terminals and maintaining track on a far-end terminal during two-way communication. Acquisition, pointing, and tracking module 118 receives information about the terminal's own position from a global position system (GPS) and inertial navigation system (INS) module 120, which determines the terminal's position from GPS data. The GPS information is derived from a pseudorange signal received via a GPS antenna 122 from GPS satellites. Optionally, the GPS data can be supplemented with inertial navigation data derived from on-board sensing of acceleration of the terminal.

Coarse pointing of telescope 104 is accomplished by acquisition, pointing, and tracking module 118 controlling the azimuth and elevation of gimbal 102. A gimbal position sensor 124 reports the gimbal position to acquisition, pointing, and tracking module 118, which provides positioning control signals to a gimbal controller 126 to drive the gimbal to a desired angle based on feedback from beacon receiver 116.

Acquisition, pointing, and tracking module 118 also controls a fast-steering mirror 128 via a fast-steering mirror controller 130 (e.g., a piezoelectric drive mechanism) to effect fine pointing and tracking of laser beams. Specifically, fast steering mirror 128 is disposed along the common optical axis between telescope 104 and beamsplitter 112 and deflects incoming and outgoing laser beams at a selected angle to control the angle at which laser beams are transmitted and received by telescope 104. Feedback from a fast-steering mirror position sensor 132 and the beacon laser beam detected by position sensor detector 114 is used to control the rotation angle of fast steering mirror 128 to achieve a deflection angle corresponding to the detected angle of the far-end transceiver, as described in detail below.

Terminal 100 also includes an RF transceiver 134 which supplies and receives RF signals. Optionally, RF signals can be transmitted and received via telescope 104. In this case, RF signals can be coupled between the common optical axis and an RF feedhorn (not shown) via an RF/optical beamsplitter (not shown). Another option is to transmit and receive RF signals via a separate RF antenna mounted on gimbal 102. The RF transceiver can be used in an initial acquisition process to send position information derived from GPS/INS module 122 to the far-end transceiver terminal to provide initial pointing information to the far-end terminal. Further, the RF transceiver can be used to transmit data during periods in which the optical data link is temporarily lost.

A beacon laser transmitter 136 generates beacon laser beams transmitted to the far-end terminal to support acquisition, pointing, and tracking. The beacon laser can be, for example, a diode bar laser operating over 1.40 to 1.50 microns. Alternatively, the beacon laser can be a fiber laser operating in the wavelength range of 1.5 to 1.6 microns. The beacon laser beams preferably have a wider beamwidth than the data laser beams and are transmitted from a separate beacon aperture assembly mounted on gimbal 102. The beacon aperture assembly includes the capability to transmit beacon laser beams having different beam divergences.

A wide beacon is good for acquisition, because it increases the likelihood of detection by covering a broader field. The disadvantage of a wide beacon is that the signal-to-noise ratio is smaller than with a narrow beacon, because less of the energy is concentrated onto the position detector. In acquisition, this can be acceptable as long as enough energy is there to steer the gimbal to the point where narrow beams can be detected and tracking can proceed using narrower beacon laser beams. The narrow beacon has the advantage of better signal to noise but the disadvantage that the tolerance to pointing error due to platform motion is less than for a wider beam. The widest beacon that has enough signal should be selected for acquisition while the narrowest beacon that can tolerate platform motion should be selected for tracking.

Thus, the system can be configured to have more than two beacons, allowing the acquisition and tracking beacons to be chosen based on the current operating environment. Further, the acquisition scheme can be designed to progressively switch from a wide acquisition beam to one or more narrower acquisition beams until finally the tracking beam divergence is used. Optionally, the system can have the capability to adjust the divergence over a continuous range of values between some minimum and maximum.

Referring again to FIG. 1, an exemplary embodiment of a beacon aperture assembly is shown in which a wide acquisition beacon laser beam and a narrow tracking beacon laser beam are generated. A MEMS switch 142 receives the beacon laser signal from beacon laser transmitter 136 and selectively supplies the beacon laser signal to one of two apertures 138 and 140, depending on whether a wide, acquisition beacon laser beam or a narrower tracking beacon laser beam is to be transmitted. By way of example, the beacon aperture lenses 138 and 140 can be coupled via 400 micron multimode fibers from the MEMS switch 142. For simplicity, the coupling between the beacon aperture assembly and the beacon laser transmitter 136 has been omitted in FIG. 1. The beacon apertures 138 and 140 are aligned with telescope 104 such that the acquisition and tracking beacon laser beams are substantially co-aligned with the transmit data laser beam. As previously explained, incoming beacon laser beams are received by telescope 104 and not the beacon aperture assembly.

While the illustrated embodiment generates beams of two different divergences, the invention is not limited to this particular implementation, and any number of beam divergences over a range of divergences can be generated to perform acquisition and tracking. In accordance with another embodiment of the present invention, the beacon aperture assembly can include a single zoom lens capable of producing beacon laser beams over a continuous range of beam divergences.

Data laser transmitter 106, optical receiver 108, beacon receiver 116, beacon laser transmitter 136, and RF transmitter 134 can be located within the platform remote from gimbal 102. For example, in the case of an airborne platform, these modules are preferably located in an internal pressured compartment (e.g., mounted on racks within the fuselage of the aircraft), with the laser transmitter and receiver modules being coupled to the gimbal-mounted turret via fiber optic cables. In this manner, the components that generate and receive the modulated laser energy are not exposed to the harsh environment seen by the turret mounted outside the aircraft skin. This arrangement has the twofold advantage of relaxing the operating conditions on the most sensitive devices and minimizing the turret size that is externally exposed. Only system components that interface to free space (i.e., optical telescopes) or perform pointing and tracking are required within the turret envelope.

The optical wavelengths used for transmitting and receiving the data and beacon laser beams are preferably in the eye-safe region of the spectrum (i.e., wavelengths longer than about 1.4 microns), such as wavelengths in the telecommunications C and L bands or between about 1530 nm and 1600 nm. These wavelengths permit commercially-available optical components to be used in the laser transceiver. Nevertheless, the invention is not limited to any particular range of optical wavelengths. Thus, as used herein and in the claims, the term "optical" refers generally to the range of wavelengths of electromagnetic signals within which "optical" equipment (e.g., optical communication equipment, transmitters, receivers, etc.) typically operates, including the visible spectrum, infrared wavelengths, and ultraviolet wavelengths.

Figure 2:
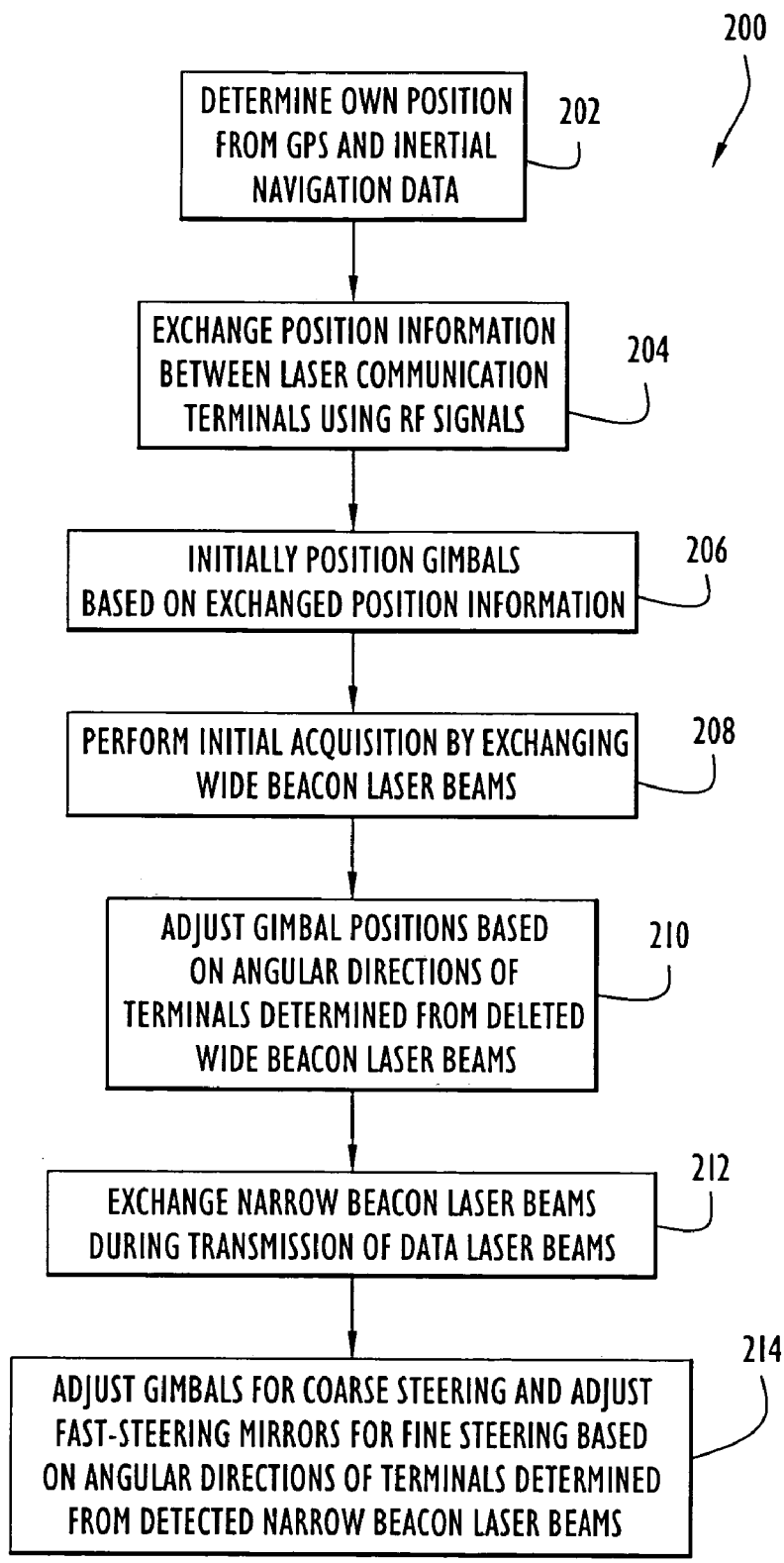
FIG. 2 is a functional flow diagram of the operations performed in acquiring and tracking a laser communication terminals in a laser communication system according to an exemplary embodiment of the present invention.

The flow diagram 200 in FIG. 2 summarizes acquisition, pointing, and tracking operations performed by terminal 100 shown in FIG. 1 in accordance with an exemplary embodiment of the present invention. To perform initial acquisition and pointing toward a remote terminal, in operation 202, GPS/INS module 120 determines the current position of the terminal (i.e., the terminal's own position) from GPS and INS information. This position information is supplied to laser communication controller 110, which sends the position information to the far-end terminal via an RF transmission generated by RF transceiver 136 (operation 204). The beamwidth of the transmitted RF signal is preferably very broad, since the direction of the remote terminal may not be well-known at this point. Optionally, scanning of the RF beam can be performed as part of the initial acquisition if necessary, or a relatively long wavelength (e.g., in the UHF region) or small antenna aperture can be used to produce a broad beam.

The remote, far-end terminal also transmits its position information to the local terminal via an RF signal, which is received by RF transceiver 134 and supplied to laser communication controller 110. In operation 206, this far-end terminal position information is supplied to acquisition, pointing, and tracking module 118, which commands gimbal controller 126 to point gimbal 102 in the direction indicated by the far-end terminal position information. Acquisition, pointing, and tracking module 118 determines the pointing direction by taking into account the current position of the local terminal supplied by GPS/INS module 120. Likewise, upon receipt of the local terminal's position, the far-end terminal points its gimbal in the direction indicated by the local terminal's position. In this manner, both terminals perform initial coarse pointing of the gimbals toward each other, along with the data and beacon laser apertures mounted thereon. With commercially available GPS/INS equipment (e.g., a Honeywell 764G INS), this process can be expected to yield an angular pointing accuracy on the order of several milliradians (e.g., a 90% confidence interval for the pointing direction of about 7 milliradians).

Next, in operation 208, optical acquisition and tracking is initiated by each terminal transmitting a beacon laser beam with a broad beam divergence of, for example, 7 milliradians via the beacon aperture assembly. As previously explained, the invention is not limited to any particular beam divergences, and optionally the divergence of the acquisition beacon laser beam can be selected from a range of value based on operating conditions. The exchanged wide-beam beacon laser beams are received by the telescope 104 of each terminal and directed onto position sensing detector 114 (e.g., a quad cell detector) by beamsplitter 112. The output of position sensing detector 114 is processed by beacon receiver 116, which supplies information about the angular direction of the beacon signal to the laser communication controller 110 and/ or acquisition, pointing, and tracking module 118. If necessary, the gimbal positions can be adjusted based on the angular directions of the terminals determined from the detected wide-beam beacon laser beams (operation 210).

Once the wide-beam beacon laser beams are acquired and locked onto, in operation 212, the terminals switch to transmitting narrow beacon laser beams. The exchanged narrow beacon laser beams can have a beamwidth that is about an order of magnitude narrower than the wide-beam beacons, for example, with a divergence of about 0.7 milliradians, yielding a 20 dB increase in the signal-to-noise ratio of the beacon laser beam detected at the quad cell detector relative to the wide-beam beacon. Thus, the narrow beacon laser beam provides the fine tracking resolution and signal strength needed to track the terminal at distances over 100 km. Again, the invention in not limited to a particular beam divergence for the tracking beacon laser beam or any particular ratio of divergences between the acquisition beacon laser beam and the tracking beacon laser beam.

Figure 3:
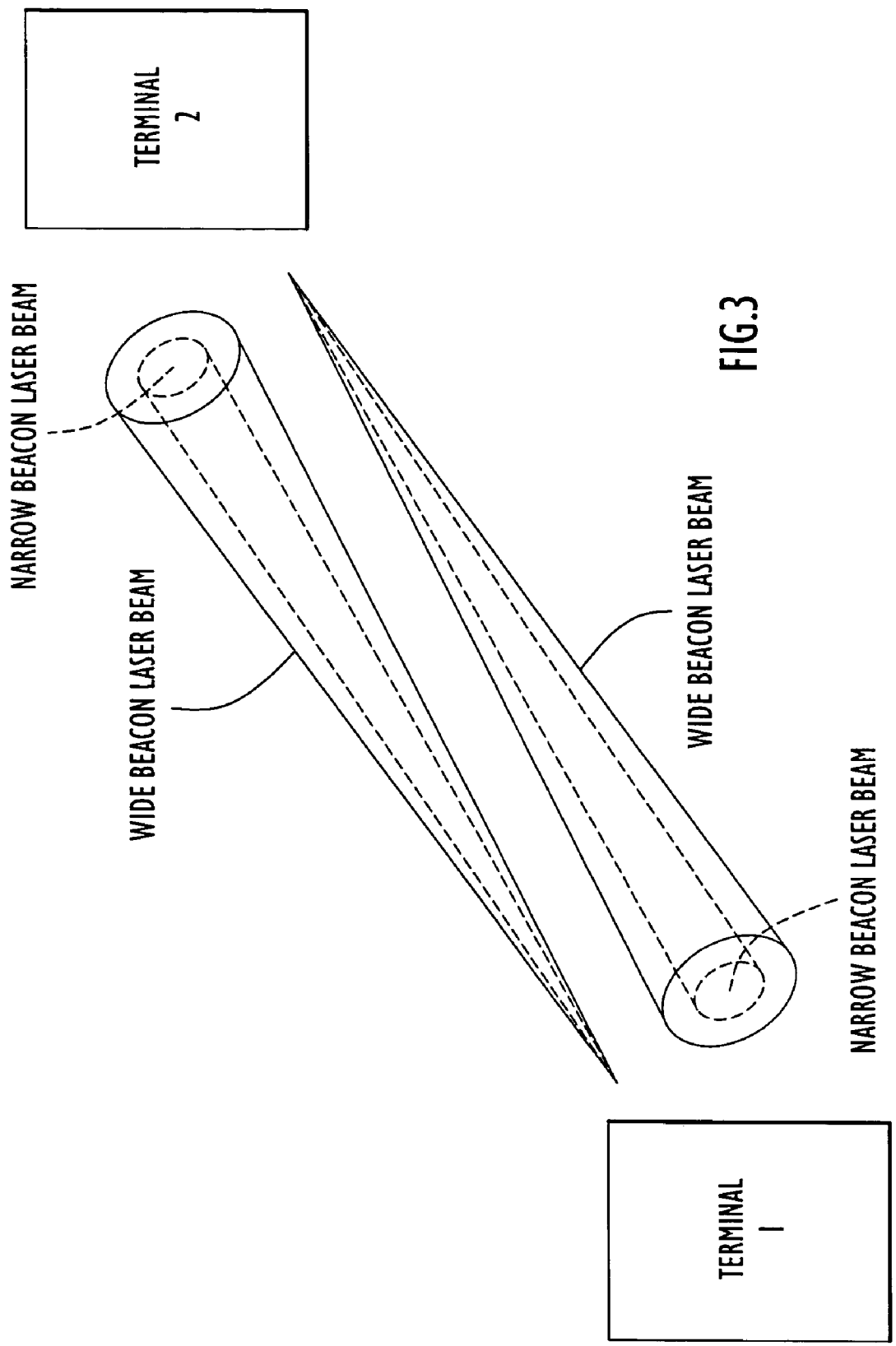
FIG. 3 is a diagram showing the exchange of wide-beam and narrow-beam beacon laser beams between two terminals of a laser communication system according to an exemplary embodiment of the present invention.

The process of exchanging wide and narrow beacon laser beams in sequence between two terminals is depicted conceptually in FIG. 3. The beamwidths shown in FIG. 3 are not to scale. The wide beacon laser beam has a divergence that essentially ensures a smooth handoff between the initial gimbal pointing (based on GPS/INS data) and tracking with the narrow beacon laser beam. Optionally, a multi-step acquisition can be performed with successively narrower beams until a suitable divergence is reached for tracking. Comparatively, the data laser beams have a fraction of the beamwidth of the narrow beacon laser beam, in this example, on the order of 0.15 to 0.35 milliradians. Given the broader divergence of the narrow beacon laser beam, it is easier to maintain track on a far-end terminal using the narrow beacon laser beam than it would be if using a split-off portion of the received data lasers.

Pointing and tracking of the laser communications terminal (operation 214 in FIG. 2) is accomplished by with a nested control loop of coarse and fine steering using feedback from the detected narrow beacon laser beam. The coarse steering is performed by controlling the position of gimbal 102 which can have, for example, a nominal pointing accuracy of about 3 milliradians. The fine steering is accomplished by controlling fast steering mirror 128 inside gimbal 102. By way of a non-limiting example, fast steering mirror 128 can have a closed-loop pointing accuracy of approximately 5 microradians and a resonant scanning frequency of 0.8 kHz, with a total 50 milliradian tilt range. The 10× telescope 104 operates as a beam expander in front of the fast-steering mirror and thereby yields a 5 milliradian excursion. Note again that, in the configuration shown in FIG. 1, the fast steering mirror lies along the common optical axis of telescope 104 and consequently steers both data and beacon laser beams on receive, but steers only the data laser beam on transmit, since the beacon is transmitted via a separate aperture assembly. Consequently, the direction of the beacon transmission is controlled only by the gimbal position and not the position of the fast-steering mirror.

Any of a variety of control schemes can be employed to implement the coarse/fine tracking. According to one exemplary approach, laser communication controller 110 receives the beacon receiver signal which corresponds to the angle of arrival of the beacon laser beam and steers fast-steering mirror 128 to center the signal on the quad cell detector 114. At the same time, measurements from the strain gages of the fast-steering mirror position sensor 132, which indicate the tip and tilt of the fast-steering mirror, are supplied to acquisition, pointing, and tracking module 118 which controls gimbal 102. The gimbal 102 is controlled such that by moving it allows the fast-steering mirror 128 to stay near the center of its field of regard.

Figure 4:
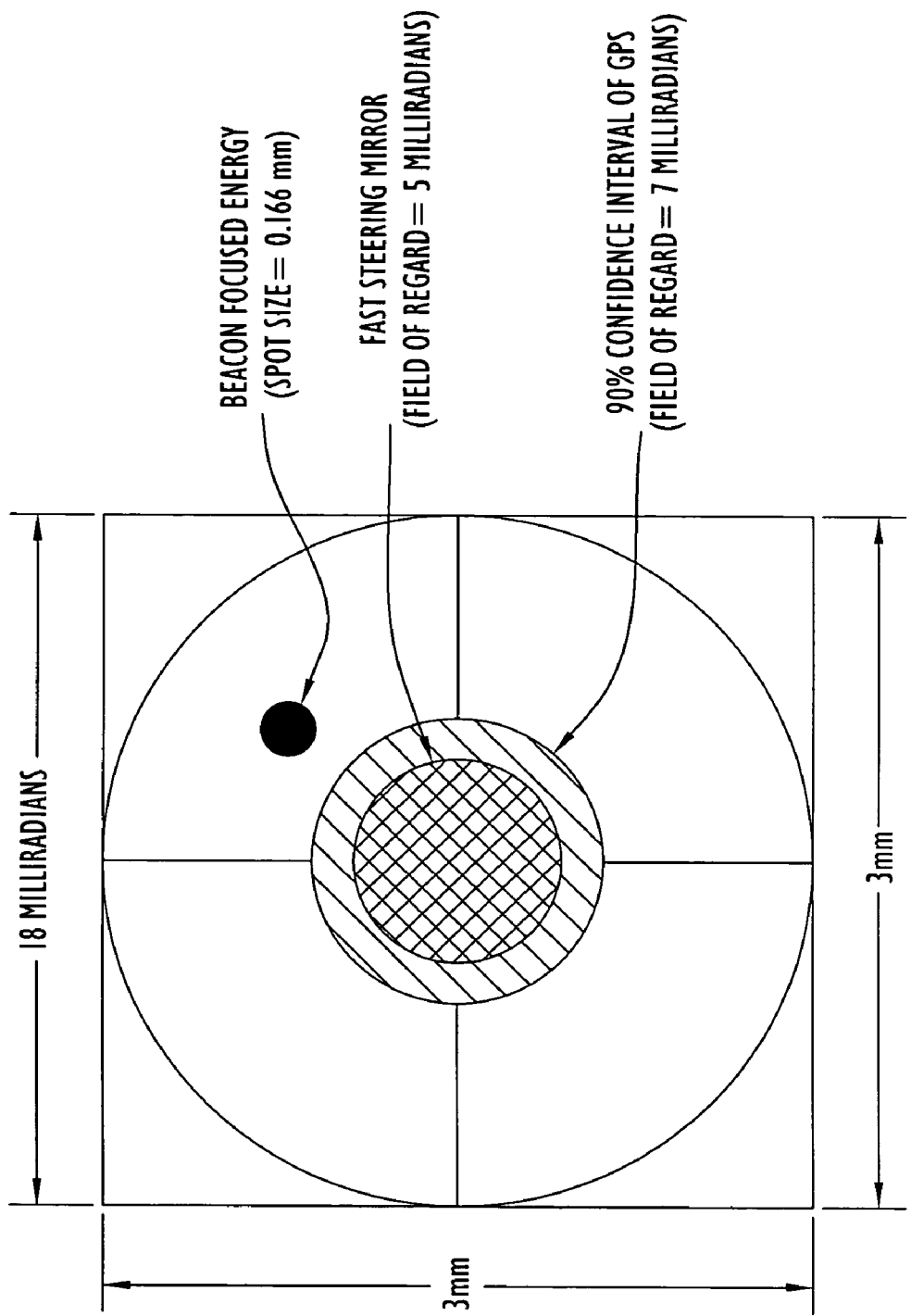
FIG. 4 is a diagram illustrating sizes of various beams relative to the field of view of a quad cell detector.

An example of a quad cell detector suitable for use as position sensing detector 114 is shown in FIG. 4. The quad cell detector can be a 3 mm×3 mm device made of InGaAs. The optics in front of the quad cell define a field of view of 18 milliradians with the typical beacon focused spot size of about 166 microns. The fast-steering mirror 128 has a total field of regard (FOR) of 5 milliradians, such that if the focused energy lies outside this FOR, the gimbal will be driven to center the beacon energy onto the quad cell. The 7 milliradian field of regard corresponding to the 90% confidence interval provided by the GPS position data is also shown in FIG. 4 for contrast.

In accordance with another aspect of the present invention, the beacon laser beams can be modulated in a unique manner to simplify the beacon detection scheme. In particular, the beacon laser energy can be modulated on and off or "chopped" at a relatively low frequency to produce a square-wave signal whose modulation frequency can be detected. As used herein and in the claims, modulating "on and off" refers to sequentially alternating between a laser beam at a first power level and at a second power level that is preferably a very low or zero power level. For example, the beacon laser transmitter can be a 15 watt multi-mode diode bar laser transmitting at a wavelength of 1480 nm with adjustable chopping frequency. That is, the rate of on/off modulation of the laser energy can be programmable, for example, in the 4 to 15 kHz region. A 50% on/off duty cycle can be used to produce a balanced square wave. In general, the invention is not limited to any particular chopping frequencies or duty cycles; thus, higher or lower frequencies than those in the exemplary range could also be used.

The chopped beacon signal provides a number of advantages. A unique beacon chopping frequency can be used for each terminal in the laser communication system, such that detection of the chopping frequency identifies which terminal is sending the beacon signal. For example, two terminals can establish optical communication with each other and maintain track, where one terminal employs a beacon chopping frequency of 6300 Hz and the other terminal employs a beacon chopping frequency of 9450 Hz.

Another advantage of the chopped beacon signal is that every terminal can transmit and receive beacon signals on the same wavelength, since the beacon chopping frequency can be used to differentiate one beacon signal from another. This greatly simplifies the overall beacon design and system architecture, since neither the beacon laser transmitter or receiver needs to be tunable or adjusted (the beacon signal can always be detected without wavelength tuning) and the beacon hardware can be identical in all terminals. Note that it is much easier from a design and operation standpoint to adjust the chopping frequency of the beacon signal to provide differentiation between beacon signals than to use different wavelengths as a differentiator. Optionally, of course, both different chopping frequencies and different optical wavelengths can be used to differentiate source terminals if necessary.

Another advantage of chopping the beacon signal is that the on/off modulation creates a square-wave AC signal whose frequency is that of the chopping frequency. Consequently, the chopped beacon laser signal can be AC coupled to the position sensor detector. By AC coupling the position sensor detector, continuous signals that create a DC bias do not affect the detection process. Thus, for example, unwanted signals such as solar radiation and glint, which tend to be constantly streaming light, merely cause a DC signal bias when detected along with the chopped beacon signal and are automatically filtered out by the AC coupling. Thus, the chopped beacon laser beam provides additional immunity to these types of interference, and permits the laser communication terminals to maintain track of far-end targets when such interference is present. Additionally, an optical bandpass filter (not shown) is positioned in front of the detector quad cell 114 to block background noise. The filter has substantially the same pass band as the beacon laser spectral bandwidth.

As previously mentioned, current position sensor detectors have frequency bandwidth up to about a few megahertz, making them unsuitable for detecting laser beams modulated at higher frequencies with data signals. Of course, receivers used to detect data laser signals can detect such signals; however, laser data receivers do not typically provide information on the angle of arrival of a received data laser beam. In accordance with another embodiment of the present invention, a conventional position detector sensor can be replaced with an array (4×4 or 8×8) of elements that essentially detect laser signals in the manner of a data laser beam receiver and provide differential signals indicative of angle of arrival. In this manner, tracking could be performed with the data laser beams themselves while still modulating the data laser beams in the gigahertz frequencies, and the narrow beacon laser beam can be eliminated (the wide beacon laser beam can still be used for acquisition). In this case, a portion (e.g., 10%) of the receive data beam would be split off for use in position detection or the position detector could also serve as the data laser receiver.

The transceiver terminals of the present invention can be used to transmit virtually any type of information or data including, but not limited to: sensor data, navigation signals, voice signals, image signals, video signals, data relating to an application running on a processor, control signals, and overhead or communication protocol signals (e.g., relating to the communication protocol, handshaking, routing, equipment configuration, etc.). In particular, sensors that collect information for intelligence, surveillance, and reconnaissance generate a substantial amount of data and can benefit from the high data rates employed in laser communications to transmit the information in a reasonable amount of time.

Aspects of the architecture described herein may be used in other related fields. For example, the acquisition, pointing, and tracking schemes may be useful in LADAR systems for position tracking and two and three dimensional imaging or in laser vibrometry to investigate properties of surfaces.

Having described preferred embodiments of new and improved acquisition, pointing, and tracking system for laser communication, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method for acquisition and tracking of laser communication terminals in a free-space laser communication system, comprising:
    (a) exchanging position information between laser communication terminals using RF signals;
    (b) acquiring the laser communication terminals by exchanging beacon laser beams between the laser communication terminals, the beacon laser beams being transmitted via a beacon aperture and received via a data aperture of the respective laser communication terminals, wherein, in each of the laser communication terminals, received beacon laser beams are supplied from the data aperture to a beacon receiver, the beacon laser beams being steered in accordance with the exchanged position information;
    (c) communicating between the laser communication terminals by exchanging data laser beams via the data apertures of the respective laser communication terminals; and
    (d) tracking the laser communication terminals by exchanging beacon laser beams between the laser communication terminals and steering the data laser beams based on feedback from the beacon laser beams, wherein the beacon laser beams have a greater beam divergence and a different wavelength than the data laser beams.

2. The method of claim 1, wherein the beacon laser beams exchanged to acquire the laser communication terminals have a greater beam divergence than the beacon laser beams exchanged to track the laser communication terminals.

3. The method of claim 1, wherein (d) includes adjusting the position of a gimbal to perform coarse steering and adjusting the position of a steering minor to perform fine steering.

4. The method of claim 1, wherein (b) includes steering the beacon laser beams using gimbals without using a steering mirror for steering the beacon laser beams on transmission.

5. The method of claim 1, wherein the laser communication terminals transmit the beacon laser beams at the same wavelength.

6. The method of claim 1, wherein the beacon laser beams are modulated on and off such that the beacon laser beams are chopped beacon laser beams.

7. The method of claim 6, wherein the laser communication terminals transmit the chopped beacon laser beams with different chopping frequencies, such that the chopping frequencies identify the laser communication terminals transmitting the chopped beacon laser beams.

8. The method of claim 6, wherein detection of the chopped beacon laser beams is performed using AC coupling.

9. The method of claim 1, wherein the position information is based on GPS information.

10. The method of claim 1, wherein a divergence of the beacon laser beams is adjustable over a range.

11. The method of claim 1, wherein the RF signals are transmitted from and received by the data aperture.

12. A free-space laser communication terminal, comprising:
    a beacon aperture assembly for transmitting beacon laser beams for acquiring and tracking a remote terminal;
    a data aperture for transmitting and receiving data laser beams for communicating with a remote terminal and for receiving the beacon laser beams;
    a steering mirror for controlling an angle at which laser beams are transmitted and received by the data aperture;

a gimbal system on which is mounted the beacon aperture assembly and the data aperture and the steering mirror;

a position sensor detector for detecting a direction of beacon laser beams received by the data aperture; and a controller for controlling positioning of the gimbal system to effect coarse steering of the beacon aperture assembly and the data aperture toward the remote terminal and for controlling positioning of the steering mirror to effect fine steering of the data aperture based on feedback from the position sensor detector.

13. The terminal of claim 12, wherein the data aperture is a telescope.

14. The terminal of claim 12, wherein the beacon aperture assembly transmits the beacon laser beams with a greater beam divergence than the data laser beams transmitted by the data aperture.

15. The terminal of claim 12, wherein the beacon aperture assembly transmits the beacon laser beams at a different wavelength than the data laser beams transmitted by the data aperture.

16. The terminal of claim 12, wherein the beacon aperture assembly includes a first beacon aperture for transmitting an acquisition beacon laser beam for acquisition of the remote terminal and a second beacon aperture for transmitting a tracking beacon laser beam for tracking of the remote terminal, wherein the acquisition beacon laser beam has a greater beam divergence than the tracking beacon laser beam.

17. The terminal of claim 16, wherein the beacon aperture comprises a zoom lens operable to adjust a divergence of the beacon laser beams over a range.

18. The terminal of claim 12, wherein the controller controls steering of the beacon aperture assembly without use of the steering mirror.

19. The terminal of claim 12, wherein the beacon aperture assembly transmits beacon laser beams at the same wavelength that the data aperture receives beacon laser beams.

20. The terminal of claim 12, wherein the beacon aperture assembly transmits beacon laser beams that are modulated on and off such that the beacon laser beams are chopped beacon laser beams.

21. The terminal of claim 20, wherein the beacon aperture assembly transmits chopped beacon laser beams with a first chopping frequency, and the data aperture receives chopped beacon laser beams with a second chopping frequency that is different from the first chopping frequency.

22. The terminal of claim 12, wherein the position sensor detector is a quad cell detector.

23. The terminal of claim 12, wherein the position sensor detector is AC coupled.

24. The terminal of claim 12, further comprising:
an RF transceiver for transmitting position information indicating the terminal's position and for receiving remote position information indicating the remote terminal's position, wherein the controller initially positions the gimbal system toward the remote terminal based on the remote position information.

25. The terminal of claim 24, wherein the position information is based on GPS information.

26. The method of claim 12, wherein the RF signals are transmitted from and received by the data aperture.

27. A free-space laser communication system, comprising:
first and second laser communication terminals configured to communicate by exchanging data laser beams modulated with data, each of the first and second laser communication terminals including a beacon aperture assembly and a data aperture, wherein:

the first and second laser communication terminals are configured to exchange acquisition beacon laser beams to perform initial acquisition, exchange position information using RF signals, and to steer the acquisition beacon laser beams based on the position information;

the first and second laser communication terminals are configured to exchange tracking beacon laser beams to perform tracking to steer the data laser beams, wherein the tracking beacon laser beams have a beam divergence no greater than the acquisition beacon laser beams;

each beacon aperture assembly is configured to transmit the acquisition and tracking beacon laser beams;

each data aperture is configured to transmit and receive the data laser beams and to receive the acquisition and tracking beacon laser beams; and each of the first and second laser communication terminals comprises a beacon receiver that receives incoming acquisition and tracking beacon laser beams from the data aperture.

28. The system of claim 27, wherein a divergence of the acquisition beacon laser beams is adjustable over a range, and a divergence of the tracking beacon laser beams is adjustable over a range.

29. The system of claim 27, wherein the tracking beacon laser beams have a greater beam divergence than the data laser beams.

30. The system of claim 27, wherein the first and second laser communication terminals transmit the acquisition and tracking beacon laser beams at a different wavelength than the data laser beams.

31. The system of claim 27, wherein each of the first and second laser communication terminals includes:
a gimbal system for steering the acquisition and tracking beacon laser beams and the data laser beams; and
a steering minor mounted on the gimbal system for fine steering of the data laser beams.

32. The system of claim 31, wherein
the beacon aperture assembly and the data aperture are mounted on the gimbal system.

33. The system of claim 27, wherein each of the first and second laser communication terminals transmits the acquisition and tracking beacon laser beams at the same wavelength.

34. The system of claim 27, wherein the first and second laser communication terminals modulate the acquisition and tracking beacon laser beams on and off such that the acquisition and tracking beacon laser beams are chopped beacon laser beams.

35. The system of claim 34, wherein the first laser communication terminal transmits the chopped beacon laser beams with a first chopping frequency and the second laser communication terminal transmits the chopped beacon laser beams with a second chopping frequency that is different from the first chopping frequency.

36. The system of claim 34, wherein each of the first and second laser communication terminals includes a position sensor detector for detecting the chopped beacon laser beams, the position sensor detector being AC coupled.

37. A method for acquisition and tracking of laser communication terminals in a free-space laser communication system, comprising:
(a) pointing the laser communication terminals by exchanging position data by RF signals and exchanging beacon laser beams between laser communication terminals by transmitting the beacon laser beams via respective beacon apertures of the laser communication terminals and detecting the beacon laser beams received via respective data apertures of the laser communication terminals, wherein the beacon laser beams are modulated on and off such that the beacon laser beams are chopped beacon laser beams;

(b) acquiring the laser communication terminals using the chopped beacon laser beams received via the respective data apertures; and (c) tracking the laser communication terminals using the chopped beacon laser beams received via the respective data apertures such that data laser beams exchanged by transmitting and receiving the data laser beams via the respective data apertures of the laser communication terminals to effect communication are steered based on feedback from detection of the chopped beacon laser beams.

38. The method of claim 37, wherein the laser communication terminals transmit the chopped beacon laser beams with different chopping frequencies, such that the chopping frequencies identify the laser communication terminals transmitting the chopped beacon laser beams.

39. The method of claim 37, wherein the laser communication terminals transmit the chopped beacon laser beams at a same optical wavelength.

40. The method of claim 37, wherein detection of the chopped beacon laser beams is performed using AC coupling.

41. The method of claim 37, wherein the chopped beacon laser beams have a greater beam divergence and a different wavelength than the data laser beams.

42. A method for acquisition and tracking of laser communication terminals in a free-space laser communication system, comprising:

(a) pointing the laser communication terminals by exchanging position data by RF signals via respective data apertures of the laser communication terminals and acquiring the laser communication terminals by exchanging beacon laser beams between the laser communication terminals, wherein acquisition of the laser communication terminals relies on the beacon laser beams received via the respective data apertures;

(b) communicating between the laser communication terminals by exchanging data laser beams respectively transmitted from and received by the respective data apertures of the laser communication terminals; and (c) tracking the laser communication terminals by detecting the data laser beams with a detector array to determine a direction of the data laser beams and steering the data laser beams based on feedback from the detector array.

43. The method of claim 42, wherein the beacon laser beams have a greater beam divergence and a different wavelength than the data laser beams.

* * * * *

UNITED STATES PATENT AND TRADEMARK OFFICE
CERTIFICATE OF CORRECTION

| | |
|---|---|
| PATENT NO. | : 7,609,972 B2 |
| APPLICATION NO. | : 11/194741 |
| DATED | : October 27, 2009 |
| INVENTOR(S) | : James Cunningham et al. |

It is certified that error appears in the above-identified patent and that said Letters Patent is hereby corrected as shown below:

Column 10, line 35, replace "steering minor" with -- steering mirror --; and

Column 12, line 35, replace "steering minor" with -- steering mirror --.

Signed and Sealed this

Twenty-second Day of December, 2009

David J. Kappos
*Director of the United States Patent and Trademark Office*